Patented July 10, 1934

1,966,281

UNITED STATES PATENT OFFICE 1,966,281

HYDROLYSIS OF HALOGENATED HYDROCARBONS

Johann A. Bertsch, St. Louis, Mo., assignor, by mesne assignments, to Monsanto Chemical Company, a corporation of Delaware No Drawing. Application January 31, 1931, Serial No. 512,754

9 Claims. (Cl. 260—154)

This invention relates to the hydrolysis of halogenated hydrocarbon according to which the hydrocarbon, such as chlorbenzol is mixed with steam and caused to interact at elevated temperatures in the presence of a novel class of catalytic bodies for this reaction.

It has been proposed heretofore to manufacture phenol from chlorbenzol by passing the vapors of chlorbenzol mixed with steam at elevated temperature over various catalytic compositions. Among these may be mentioned alumina, unglazed porcelain, silica gel, as well as combinations of silica gel, aluminum oxide or aluminum hydroxide with promoters consisting of salts of various metals including copper, nickel, cobalt, etc. According to the present invention, I provide a characteristic class of compositions for the purpose of effecting the hydrolysis, which not only appears to function in a manner unlike the material recommended heretofore, but also enables one to obtain results which in most instances are superior to those obtainable with known materials, and in addition affords certain technical advantages not afforded by the present day materials.

In practicing this invention, I provide a class of complex artificial compounds which possess at least feeble base exchange properties. In general, it may be stated that the compositions contain as a basis compound one or more of the following elements: silicon, titanium, chromium, aluminum, tin, boron, etc. In addition, the catalytic material may contain one or more promoter elements in chemical combination therewith of which the following may be mentioned: copper, silver, nickel, cobalt, gold and metals of the platinum group. A large variety of material may be included which have no ill effect, and in some instances indeed have a desirable effect. Among these may be included the alkali metals, as well as the alkaline earth metals. The presence of iron appears to have a deleterious effect.

One convenient method of preparing a catalyst consists in exchanging ordinary permutite with a compound of the promoter elements hereinabove mentioned. The resulting product is a zeolite in which the promoter element is in exchangeable form. The method of preparing the catalyst may follow by analogy the procedure described in Patent No. 1,256,032, wherein a zeolite, such as sodium permutite is treated with nickel nitrate whereby the sodium is replaced by the nickel or as described in U. S. Patent No. 1,215,396 wherein sodium zeolite is treated with a dilute, acidified solution of palladium subchloride. If desired, however, the promoter element may be essentially in the non-exchangeable form. For this purpose, one may advantageously proceed in the preparation of the catalyst substantially as described in my joint Patent No. 1,782,353. The compounds formed, according to the present invention may be impregnated in a carrier substance while in a gelatinous or liquid form and thereafter molded into pellets of a desired size. Thus following the procedure described in my co-pending joint application, S. N. 95,771, filed March 18, 1926.

The following examples of the manufacture of the catalysts are specifically set forth, it being understood that these are illustrative only and that for further examples for the preparation of a catalyst reference may be had to the literature now available in the art, notably, my joint patent and application.

It is to be noted that I make no claim in this application to the method of manufacturing the catalytic mass nor to the resulting product, but I do claim broadly the use in the hydrolysis of chlorinated hydrocarbons of silicious or non-silicious artificial base exchange bodies, either alone or when mixed with fillers such as kieselguhr, tripoli, opalite, carrara silica, pumice stone, aluminum oxide, and various other materials upon which the active catalytic mass may be deposited, or with which it may be molded into pellets.

It is to be further understood that the catalytic mass may and probably does undergo physical and chemical changes in the course of its use. In many instances, these changes do not have a deleterious effect upon the quality of the catalyst. Accordingly, it is to be understood that the claim comprehends the use in the aforementioned reaction not only the freshly prepared catalyst, but the products resulting after use in promoting the desired catalytic reaction. An example of what is meant may be illustrated by referring to the hydrolysis of chlorbenzol with steam in the presence of a copper-silica catalyst (made according to Example 1). The original material is a characteristic permutite in that it has strong base exchange properties. In the course of the use of the material a change in chemical structure takes place, the copper present being reduced at least in part to metallic copper as can be seen from the appearance of the used mass which resembles freshly reduced metalic copper metal. Nevertheless, the product retains its activity and may be used indefinitely. In this connection, it is interesting to note that when silica gel, which has been impregnated with a copper salt, is employed, the activity of the mass diminishes, the copper salt appears to change into the form of a black oxide and does not reduce to metallic copper even after prolonged use. Silica gel is further distinguishable from permutite or base exchange bodies in that the former as offered on the market possesses marked gas absorption properties whereas the latter are substantially without gas absorptive power. The following specific examples illustrate various embodiments of the principles of my invention.

*Example 1.*—A copper complex catalyst is made by first preparing and thereafter mixing two solutions: (1) containing 620 parts of sodium water-glass (20.95% $SiO_2$) which has been mixed with 3000 parts of water, 180 parts of 2 normal sodium hydroxide and 105 parts of 28% aqua ammonia; (2) containing 110.5 parts of basic copper carbonate dissolved in 400 parts of 28% aqua ammonia together with sufficient water to make up a total of 1000 parts. After the solutions are mixed together the resultant is allowed to stand whereupon a deep blue gel is formed. The solidification may be accelerated by the introduction of acidic agents such, for example, as carbon dioxide. The blue gel is washed thoroughly with water and dried slowly at room temperature until a hard glassy fragment is obtained which may if desired be washed again. After drying, the fragments are charged in a 2 inch externally heated non-ferrous tube and optionally exposed to a stream of air containing a small amount of HCl gas while raising the temperature up to 425° C. Thereafter and preferably while maintaining a temperature of 325°–450° C. a mixture of chlorbenzene and steam is conducted over the catalytic mass resulting in the hydrolysis of the chlorbenzene to phenol. The vapors containing unreacted chlorbenzene and steam together with phenol and hydrogen chloride are treated to separate the unreacted chlorbenzene after the admixture of steam is conducted again over a catalyst thereby permitting of a cycle process. In the event the hydrogen chloride is not required as such, the vapors may be conducted through a suspension of hydrated lime or carbonate of lime thereby absorbing the HCl and otherwise simplifying the separation of the unreacted gas mixture.

The above complex sodium copper silicate has strong base exchange power, it being capable of removing by a reversible process 2500 grains of hardness from water per cubic foot of the catalyst mass. If the above complex is treated with a 5% copper nitrate solution, part of the alkali is exchanged for the copper. The resulting mass is equally satisfactory for the hydrolysis processes which are the subject of the present invention. In an analogous manner the alkali may be exchanged for silver, using a 5% silver nitrate solution. The resulting product is dried and may be employed to advantage in the hydrolysis of halogenated hydrocarbons. It should be understood that in the aforementioned example as well as those hereinafter set forth, the copper content (meaning here the promoter metal content) as well as the silica content may be modified and varied within wide limits without impairing substantially the efficacy of the resulting mass. Thus, for example, conversions of 95% of chlorbenzene to phenol have been obtained with the aforementioned zeolitic catalyst, notwithstanding the fact that the proportions of copper and silver as well as silica were varied in the individual tests.

*Example 2.*—In lieu of monochlorbenzene employed in the previous example substitute orthodichlorbenzene; slightly higher temperatures are to be favored. Orthochlorphenol results.

*Example 3.*—Fifty parts of artificial sodium zeolite which may be prepared either by the wet or dry process, is transferred into a copper zeolite by digesting the same with a 10% copper sulphate solution. Five to fifteen per cent of the sodium is exchanged for copper. After washing, the resulting zeolite in which the sodium is exchanged for copper, the material is dried first at a temperature preferably below 100° C. The amount of copper so introduced is largely optional. A product wherein as much as 20% of the sodium is exchanged for copper has been found to give satisfactory results.

The resulting dried product is deposited in a catalytic chamber, preferably of a non-ferrous composition through which a mixture of steam and chlorbenzol is passed at a temperature of 325°–425° C. A yield of phenol from chlorbenzol of over 90% is easily obtained.

*Example 4.*—The washed copper zeolite prepared as described above and before desiccation is mixed with a pulverant carrier, such as kieselguhr, silica, asbestos fibers, etc. Thereafter the material is formed into pellets of suitable size and dried. The product is employed in a manner analogous to that described in Example 1.

*Example 5.*—In Example 1, substitute for the copper sulphate a 10% solution of silver sulphate. In this case, the silver is exchanged for the sodium. The resulting product will likewise be found to function as a hydrolysis catalyst although the temperature required for the reaction will in general be found to be slightly higher than in the case of copper zeolites. The material may be mixed with a carrier substance or used in an unaltered form.

*Example 6.*—An excellent catalyst may be prepared by employing a mixture of copper and silver sulphates which are exchanged for the sodium in an artificial sodium zeolite, such as is described in Example 1.

*Example 7.*—In lieu of the sodium zeolite specified in Example 1, substitute an equivalent amount of potassium zeolite. In other respects proceed as described in the previous examples. The resulting product will be found to be equally satisfactory in the hydrolysis of chlorinated aromatic compounds.

*Example 8.*—A non-silicious permutite may be prepared advantageously by mixing 10 parts of aluminum oxide in the form of potassium aluminate, dissolved in water to which there is added an ammonium solution containing one part of copper sulphate. Add a solution of aluminum sulphate, care being exercised to insure thorough agitation during the addition. After an amount of aluminum sulphate has been added which is substantially the mol equivalent of the potassium aluminate present, the mixture is applied either before or after washing to remove soluble salts, to a fragment carrier after which it is employed as in the previous examples.

The soluble salts are separated by decanting the clear solution and thereafter washing the gel, which has been formed by the addition of the aluminum sulphate, repeatedly with water.

*Example 9.*—A mixed silver copper aluminum catalyst may be prepared by causing a mixture of potassium aluminate containing copper ammonium sulphate to react with a solution of aluminum sulphate containing silver sulphate.

It is to be understood that the procedure observed in the catalysis of chlorinated compositions is the same in all of the aforementioned examples, although modifications in the temperature and the proportions of steam and chlorbenzol will be found advisable under any specific plant operation conditions. Similarly, other halogenated hydrocarbons may be substituted both of aromatic and aliphatic specie. Other combinations of the metals previously enumerated as having a promotive action in this catalytic reaction may be prepared following in general the procedure described in the patents and applications previously enumerated. Similarly, oxides of titanium, chromium, boron, tin, etc., may be substituted for the silica and alumina described in detail hereinabove and by references to the patents and application.

It will thus appear that the invention is susceptible to numerable modifications and variations without departing from the broad concept, to wit, complex artificial product having base exchange properties as catalyst in the hydrolysis of halogenated hydrocarbons.

What I claim is:

1. The method of preparing phenols which comprises reacting a nuclear halogenated benzene series hydrocarbon with steam in the presence of an artificial inorganic base exchange body containing as a component an element which is a promotor for the hydrolysis of the hydrocarbon to a phenol.

2. The method as defined in claim 1 in which the promotor element is copper.

3. The method as defined in claim 1 and further characterized in that the halogenated hydrocarbon is monochlorbenzene.

4. The method which comprises causing a nuclear halogenated benzene hydrocarbon to react with steam in the presence of an artificial base exchange body containing silica in combination and containing as an additional component a metal which is a catalyst for hydrolysis by the steam.

5. The method which comprises causing a nuclear halogenated benzene hydrocarbon to react with steam in the presence of a permutite containing as a component a metal which is a promoter of hydrolysis by steam.

6. The method as defined in claim 5 and further characterized in that the permutite contains silica in chemical combination.

7. The method as defined in claim 5 and further characterized in that the permutite contains silica and copper in chemical combination.

8. The method as defined in claim 5 and further characterized in that the permutite contains silver in chemical combination.

9. The method as defined in claim 5 and further characterized in that the permutite contains both silver and copper in chemical combination.

JOHANN A. BERTSCH.

CERTIFICATE OF CORRECTION.

Patent No. 1,966,281.

July 10, 1934.

JOHANN A. BERTSCH.

It is hereby certified that error appears in the printed specification of the above numbered patent requiring correction as follows: Page 2, line 42, after "chlorbenzene" insert which; and that the said Letters Patent should be read with this correction therein that the same may conform to the record of the case in the Patent Office.

Signed and sealed this 11th day of September, A. D. 1934.

(Seal)

Leslie Frazer
Acting Commissioner of Patents.

potassium aluminate containing copper ammonium sulphate to react with a solution of aluminum sulphate containing silver sulphate.

It is to be understood that the procedure observed in the catalysis of chlorinated compositions is the same in all of the aforementioned examples, although modifications in the temperature and the proportions of steam and chlorbenzol will be found advisable under any specific plant operation conditions. Similarly, other halogenated hydrocarbons may be substituted both of aromatic and aliphatic specie. Other combinations of the metals previously enumerated as having a promotive action in this catalytic reaction may be prepared following in general the procedure described in the patents and applications previously enumerated. Similarly, oxides of titanium, chromium, boron, tin, etc., may be substituted for the silica and alumina described in detail hereinabove and by references to the patents and application.

It will thus appear that the invention is susceptible to numerable modifications and variations without departing from the broad concept, to wit, complex artificial product having base exchange properties as catalyst in the hydrolysis of halogenated hydrocarbons.

What I claim is:

1. The method of preparing phenols which comprises reacting a nuclear halogenated benzene series hydrocarbon with steam in the presence of an artificial inorganic base exchange body containing as a component an element which is a promotor for the hydrolysis of the hydrocarbon to a phenol.

2. The method as defined in claim 1 in which the promotor element is copper.

3. The method as defined in claim 1 and further characterized in that the halogenated hydrocarbon is monochlorbenzene.

4. The method which comprises causing a nuclear halogenated benzene hydrocarbon to react with steam in the presence of an artificial base exchange body containing silica in combination and containing as an additional component a metal which is a catalyst for hydrolysis by the steam.

5. The method which comprises causing a nuclear halogenated benzene hydrocarbon to react with steam in the presence of a permutite containing as a component a metal which is a promoter of hydrolysis by steam.

6. The method as defined in claim 5 and further characterized in that the permutite contains silica in chemical combination.

7. The method as defined in claim 5 and further characterized in that the permutite contains silica and copper in chemical combination.

8. The method as defined in claim 5 and further characterized in that the permutite contains silver in chemical combination.

9. The method as defined in claim 5 and further characterized in that the permutite contains both silver and copper in chemical combination.

JOHANN A. BERTSCH.

CERTIFICATE OF CORRECTION.

Patent No. 1,966,281.                    July 10, 1934.

JOHANN A. BERTSCH.

It is hereby certified that error appears in the printed specification of the above numbered patent requiring correction as follows: Page 2, line 42, after "chlorbenzene" insert which; and that the said Letters Patent should be read with this correction therein that the same may conform to the record of the case in the Patent Office.

Signed and sealed this 11th day of September, A. D. 1934.

(Seal)

Leslie Frazer
Acting Commissioner of Patents.